United States Patent [19]

Wright et al.

[11] 3,928,557

[45] Dec. 23, 1975

[54] DEODORANT FORMULATIONS AND ANTIPERSPIRANT FORMULATIONS CONTAINING PARTICULAR ALIPHATIC DIOLS AND THEIR ESTERS

[75] Inventors: Donald L. Wright, New York, N.Y.; John W. Frankenfeld, Atlantic Highlands, N.J.

[73] Assignee: Exxon Research & Engineering Co., Linden, N.J.

[22] Filed: Oct. 28, 1970

[21] Appl. No.: 84,931

[52] U.S. Cl. .................. 424/47; 424/65; 424/66; 424/67; 424/68; 424/312; 424/343
[51] Int. Cl.$^2$. A61K 7/32; A61K 7/38; A61K 31/23
[58] Field of Search ......... 424/65, 68, 312, 343, 47; 252/522

[56] References Cited
UNITED STATES PATENTS

| | | | |
|---|---|---|---|
| 1,841,430 | 1/1932 | Bollmann | 252/522 |
| 2,354,319 | 7/1944 | Inman | 424/343 X |
| 2,404,698 | 7/1946 | Dreyling | 424/343 X |
| 2,407,205 | 9/1946 | Wilkes | 424/343 |
| 2,413,803 | 1/1947 | Tribit | 424/343 X |
| 2,496,270 | 2/1950 | Coler | 424/343 X |
| 2,523,867 | 9/1950 | Donnelly | 424/343 X |
| 2,564,606 | 8/1951 | Peray et al. | 424/343 X |
| 2,627,489 | 2/1953 | Drake et al. | 424/312 X |
| 2,819,995 | 1/1958 | Wassell | 424/343 |
| 2,854,382 | 9/1958 | Grad | 424/66 |
| 2,890,987 | 6/1959 | Hilfer | 424/154 X |
| 2,900,306 | 8/1959 | Slater | 424/65 |
| 3,222,252 | 12/1965 | Kraus | 424/312 |
| 3,235,458 | 2/1966 | Messina | 424/68 |
| 3,331,742 | 7/1967 | Babayon | 424/312 |
| 3,420,932 | 1/1969 | Jones | 424/47 |
| 3,555,145 | 1/1971 | Wetzel et al. | 424/47 |

OTHER PUBLICATIONS

C.A. (Chemical Abstracts) Vol. 36: p. 6750$^3$.

*Primary Examiner*—Donald B. Moyer
*Attorney, Agent, or Firm*—W. O. Heilman; Joseph J. Dvorak

[57] ABSTRACT

Improved deodorant formulations and antiperspirant formulations are secured by using as an ingredient thereof particular aliphatic diols and their esters.

4 Claims, No Drawings

DEODORANT FORMULATIONS AND ANTIPERSPIRANT FORMULATIONS CONTAINING PARTICULAR ALIPHATIC DIOLS AND THEIR ESTERS

The present invention is concerned generally with high quality deodorant formulations and antiperspirant formulations which contain as an ingredient thereof particular aliphatic diols and their esters. The formulations of the present invention are particularly desirable since they combine effectiveness with desirable physical properties and lack of human toxicity.

During the past decade, considerable progress has been made in the development of improved deodorant formulations and antiperspirant formulations. These formulations are designed to counteract the disagreeable effects which result from the perspiration exuded from the glands of the body, such as from the eccrine glands and the apocrine glands, which glands have been estimated to exceed 2,000,000. For example, the apocrine gland secretion comprises lipids and proteinaceous matter which are attacked by bacteria, causing decomposition resulting in malodors. Generally, the bacterial flora of the skin comprises micrococci. In general, three approaches have been taken to control body odors. One is to utilize antibacterial agents to arrest or prevent bacterial decomposition of perspiration by inhibiting bacterial growth. A second approach is the use of a suitable astringent to reduce the flow of perspiration. A third technique that has been suggested is the administration of anticholinergic compounds to reduce the flow of perspiration.

It has now been discovered that high quality and very effective deodorant and antiperspirant formulations can be prepared by utilizing as an ingredient of said formulation a particular aliphatic diol. These aliphatic diols and their esters, when used in deodorant and antiperspirant formulations, will function to destroy the bacteria which are harmful to the human body. These aliphatic diols, such as aliphatic 1,3-diols of 5 to 15 carbon atoms are nontoxic compounds and are very excellent when utilized as formulations which come into contact with the human body as deodorants and as antiperspirants. These formulations are far superior over current formulations not only because of their great effectiveness, but also because they are very safe to use.

The linear 1,3-diols contain from 5 to 15 carbon atoms in the diol portion of the molecule, preferably about 7 to about 10 carbon atoms in the molecule. The ester portions of the molecule contain from 2 to 20 carbon atoms, preferably from about 3 to 10 carbon atoms. If a diol ester be used, then the number of carbon atoms in the diol chain is from 4 to 15. The polyols of the present invention contain hydroxy groups and/or ester groups on at least the first and third carbon atoms of the molecule. It is this 1,3-dihydroxy configuration which renders these compounds very useful as additives because of their inherent safety. Polyalcohols with hydroxyl or ester groups in other positions on the carbon chain are toxic and, therefore, are not useful as additives. In addition to being nontoxic, the 1,3-diols and esters claimed herein have certain other advantages, making them highly desirable as additives: (1) they are stable, nonvolatile oils and have a long storage and shelf life; (2) they have an appreciable water solubility and are readily emulsified, making them easy to formulate in various preparations.

A summary of the compounds specifically claimed in this invention, along with some of their physical properties, is presented in Tables I and II. This invention is not limited to these specific compounds. Any 1,3-diol containing 5 to 15 carbon atoms or its mono- or diester is useful for one or more applications as additives for antiperspirant formulations and deodorant formulations. Diol esters which contain 4 carbon atoms in the diol chain are also satisfactory.

TABLE I

| Diol | BP/mm (°C) | Taste, Odor, etc. |
|---|---|---|
| 1,3-pentanediol | 78–81/0.5 | Colorless, sweet odor, bitter taste |
| 1,3-hexanediol | 81–82/0.2 | Colorless, slight musty odor, bitter taste |
| 1,3-heptanediol | 90/0.5 | Colorless, slight musty odor, slight bitter taste |
| 1,3-octanediol | 87–89/0.3 | Colorless, slight musty odor, slight bitter taste |
| 1,3-nonanediol | 126/1.1 | Colorless, slight musty odor, slight bitter taste |
| 1,3-decanediol | mp$^{(1)}$=30–31 | Colorless, slight musty odor, slight bitter taste |
| 1,3-undecanediol | mh$^{(1)}$=41–42 | Colorless, slight musty odor, slight bitter taste |

$^{(1)}$mp — melting point.

The best esters are those with 5 to 8 carbon hydrocarbon "tail" in either the diol or ester portion of the compound combined with a concentration of polar groups in another part of the molecule, as for example, 1,3-octanediol-1-monopropionate or 1,3-butanediol-1-monooctanoate. Some especially valuable esters are shown in the following Table II.

TABLE II

PROPERTIES OF SOME 1,3-DIOL ESTERS

| Compound | BP °C. (mm) |
|---|---|
| 1,3-Butanediol (parent diol) | |
| 1-monopropionate | |
| 1-monoctanoate | 90–95 (0.3) |
| 1-monopalmitate | MP* = 29–31 |
| dipropionate | 67–70 (0.4) |
| 1,3-Hexanediol | — |
| 1-monoacetate | 59–62 (0.15) |
| 1-monooctanoate | 117–122 (0.3) |
| 1-monopalmitate | 124–126 (0.2) |
| diacetate | 81–82 (0.9) |
| 1,3-Heptanediol | |
| 1-monooctanoate | 85–90 (1.0) |
| 1-monopalmitate | MP* = 38–39 |
| dipropionate | 90–92 (0.4) |
| 1,3-Octanediol | |
| 1-monopropionate | 83–86 (0.3) |

*MP = melting point.

In Table III are summarized the results of toxicity measurements. These studies were conducted with rats.

TABLE III
TOXICITY DATA FOR VARIOUS DIOLS

| Compounds | Polyols | Oral $LD_{50}$[3] (7 Days)[1][2] |
|---|---|---|
| 1 | 1,3-Pentanediol | >20 g/kg |
| 2 | 1,5-Pentanediol | 2 g/kg |
| 3 | 1,3-Hexanediol | >20 g/kg |
| 4 | 1,5-Hexanediol | >20 g/kg |
| 5 | 2,5-Hexanediol | 2 g/kg |
| 6 | 1,6-Hexanediol | 5 g/kg |
| 7 | 1,3-Heptanediol | >20 g/kg |
| 8 | 1,3-Octanediol | >20 g/kg |
| 9 | 1,3-Nonanediol | >20 g/kg |
| 10 | 1,3-Decanediol | >20 g/kg |
| 11 | 1,3-Undecanediol | >20 g/kg |

[1] Single dose in rats.
[2] $LD_{50}$ = lethal dose for 50% kill.
[3] $LD_{50}$ values are a common measure of the toxicity of a compound. These $LD_{50}$ values represent the lethal dose for a 50% kill of the animals tested per unit weight of the animals. The higher the $LD_{50}$ value, the lower the toxicity. The data in Table III establish that the 1,3-configurations of polyalcohols are nontoxic.

It is apparent from the above data that the positioning of the hydroxyl groups has a very significant effect on the toxicity of these compounds. Having hydroxyl groups on the first and third carbon atoms of the chain is sufficient to reduce the toxicity and render the compounds completely safe for products to be used in contact with the human body and to be stored with complete safety. Thus, there exists no danger of these products causing harm by accidental use either by adults or by children.

The diols of the present invention may be prepared by any suitable technique such as by the Reformatsky reaction followed by reduction, or by means of the Prins reaction of formaldehyde and the appropriate olefin. The esters of said diols are prepared by treating the diols with an appropriate acid derivative, such as the free acid, acid chloride or acid anhydride.

The amount of diol and diol ester used may vary widely, depending upon the particular diol or diol ester employed. Generally, about 2.0% to about 40.0% by weight of the diol or diol ester is used, based on the total composition. If the diol be a lower member such as 1,3-pentanediol, it is preferred to use about 2.0% to 10% by weight, preferably 3.0% to 6.0% by weight based on the total composition.

In order to further illustrate the invention, various formulations containing an aliphatic 1,3-diol or 1,3-diol ester as an ingredient are as follows:

Formulation 1
Antiperspirant Cream

| | % by Weight | Range |
|---|---|---|
| Glyceryl monostearate (acid stable) | 6.0 | 5-20 |
| Spermacetti | 2.5 | 1-5 |
| Water | 53.0 | 20-60 |
| Aluminum sulfate, hydrated | 20.0 | 5-35 |
| Urea | 5.0 | 2-10 |
| Sodium lauryl sulfate | 1.5 | 0.5-3 |
| 1,3-Butanediol monooctanoate* | 12.0 | 5-40 |
| | 100.0 | |
| *Replaces | Amount | |
| Glyceryl monostearate | 6.5 | |
| Cetyl alcohol | 0.5 | |
| Butylene glycol | 5.0 | |
| | 12.0 | |

Note 1,3-pentanediol may be substituted for 1,3-butanediol monooctanoate. A very desirable formulation is one where a mixture of 1,3-butanediol monooctanoate and 1,3-pentanediol is used, such as 6% by weight of each.

Formulation 2
Roll-On Antiperspirant Lotion

| | % by Weight | Range |
|---|---|---|
| Wax | 7.5 | 5-10 |
| Water | 55.0 | 40-70 |
| Chlorohydrol 50% wt/wt | 31.0 | 10-40 |
| 1,3-Octane monopropionate* | 7.5 | 5-10 |
| | 100.0 | |
| *Replaces | Amount | |
| Isopropyl myristate | 2.5 | |
| Butylene glycol | 5.0 | |
| | 7.5 | |

Formulation 3
Deodorant Lotion

| | % by Weight | Range |
|---|---|---|
| Ethanol | 70.0 | 60-90 |
| Carbitol | 4.0 | 1.0-8.0 |
| Perfume | 1.0 | 0.1-3.0 |
| Water | 8.0 | 2.0-14.0 |
| 1,3-Heptanediol* | 17.0 | 10-20 |
| | 100.0 | |
| *Replaces | Amount | |
| Ethanol | 14.5 | |
| Propylene glycol | 2.0 | |
| Hexachlorophene | 0.5 | |
| | 17.0 | |

Formulation 4
Deodorant Stick

| | % by Weight | Range |
|---|---|---|
| Stearic acid | 5.0 | 2-7 |
| Sodium hydroxide | 0.8 | 0.1-1.5 |
| Triisopropanolamine myristate | 0.9 | 0.5-3.0 |
| Ethanol (95%) | 65.0 | 10-40 |
| Carbitol | 2.0 | 0.5-4.0 |
| Water | 7.0 | 2-10 |
| Perfume | 1.0 | 0.5-3.0 |
| 1,3-Octanediol* | 18.3 | 10-20 |
| | 100.0 | |
| *Replaces | Amount | |
| Ethanol | 15.0 | |
| Hexachlorophene | 0.3 | |
| Glycerine | 3.0 | |
| | 18.3 | |

Formulation 5
Spray Deodorant

| | % by Weight | Range |
|---|---|---|
| Acetulan | 2.0 | 1-3 |
| Perfume | 2.0 | 1-4 |
| Anhydrous ethanol | 76.0 | 60-80 |
| Mixture.* | | |
| 1,3-Butanediol monooctanoate | 10.0 | 5-15 |
| 1,3-Heptanediol | 10.0 | 5-15 |
| | 100.0 | |
| *Replaces | Amount | |
| Dipropylene glycol | 20.0 | |

Formulation 6
Antiperspirant Lotions for Roll-On Containers

| | % by Weight | Range |
|---|---|---|
| Hydroxyethyl ether of cellulose | 0.5 | 0.1-1.0 |
| Aluminum chlorhydroxide (50% sol.) | 40.0 | 30-60 |

Formulation 6
Antiperspirant Lotions for Roll-On Containers (continued)

| | % by Weight | Range |
|---|---|---|
| Water | 44.5 | 30–60 |
| 1,3-Pentanediol* | 15.0 | 10–20 |
| | 100.0 | |
| *Replaces | Amount | |
| Glycerol monostearate | 2.0 | |
| Water | 13.0 | |
| | 15.0 | |

Formulation 7
Antiperspirant

| | % by Weight | Range |
|---|---|---|
| Methyl cellulose | 1.0 | 0.5–3.0 |
| Aluminum chlorhydroxide (50% sol.) | 39.0 | 30–50 |
| Perfume | 0.3 | 0.01–1.0 |
| Water | 39.7 | 30–50 |
| 1,3-Pentanediol* | 5.0 | 1–10 |
| 1,3-Octanediol monopropionate* | 15.0 | 5–18 |
| | 100.0 | |

| *Replaces | Amount |
|---|---|
| Glycerine | 3.0 |
| Ethyl alcohol | 7.0 |
| Water | 10.0 |
| | 20.0 |

Formulation 8
Antiperspiration Sticks

| | % by Weight | Range |
|---|---|---|
| Ethanol | 36.0 | 30–40 |
| Aluminum chlorhydroxide lactate | 50.0 | 40–60 |
| 1,3-Heptanediol* | 9.0 | 7–12 |
| 1,3-Pentanediol* | 5.0 | 3–7 |
| | 100.0 | |
| *Replaces | Amount | |
| Sodium stearate | 6.0 | |
| Sorbitol | 3.0 | |
| Stearyl alcohol | 0.5 | |
| Ethanol | 4.5 | |
| | 14.0 | |

Formulation 9
Antiperspirant Cream

| | % by Weight | Range |
|---|---|---|
| Stearic Acid | 14.0 | 10–20 |
| Beeswax | 2.0 | 1–5 |
| Mineral Oil | 1.0 | 0.5–3.0 |
| Aluminum chlorhydroxide | 22.0 | 15–30 |
| Water | 46.0 | 40–60 |
| 1,3-Butanediol monooctanoate* | 15.0 | 10–20 |
| | 100.0 | |
| *Replaces | Amount | |

Formulation 9 (continued)
Antiperspirant Cream

| | % by Weight | Range |
|---|---|---|
| Water | 15.0 | |

Formulation 10
Deodorant Powder

| | % by Weight | Range |
|---|---|---|
| Talc | 45.0 | 30–60 |
| Aluminum chlorhydroxide | 30.0 | 10–40 |
| Boric acid | 5.0 | 1–10 |
| 1,3-Decanediol* | 20.0 | 10–20 |
| | 100.0 | |
| *Replaces | Amount | |
| Kaoline | 20.0 | |

That the diols of the present invention are very effective against microorganisms is illustrated by the data listed in Table IV.

TABLE IV

| | Minimum Effective Concentration Against | | | | |
|---|---|---|---|---|---|
| Compound | A. niger | P. roquefortii | Ps. aeruginosa | S. typhimurium | Debaromyces Sp. |
| 1,3-Heptanediol | 0.1% | 0.05% | 0.2% | 1.0% | 0.2% |
| 1,3-Butanediol-1-monooctanoate | 0.05% | 0.05% | XX | 0.1% | 0.2% |
| 1,3-Octanediol-1-monopropionate | 0.05% | 0.05% | XX | 0.1% | 1.0% |

XX: Not effective at highest level tested, 1%.

The diol and diol esters of the present invention, in addition to preventing growth of odor-producing bacteria, have additional advantages when used in deodorants and antiperspirants. The present additives function to prevent surface drying and crystallization of creams. They provide lubricity for roll-on formulations and function to stabilize the oil-in-water emulsions of creams and lotions. In addition, they act as emollients which is especially important and desirable when aluminum salts are used.

Thus, the present invention is concerned with the use of particular diols in deodorant formulations and in antiperspirant formulations. The deodorant formulations contain antibacterial substances which are non-toxic and which do not cause skin irritations. Also, the antibacterial substances should not act excessively with respect to decreasing random bacterial flora since that would weaken the defensive mechanism of the skin against pathogenic organisms.

Antibacterial substances generally used are, for example, hexachlorophene, tetramethyl thiuram disulfide, quaternary ammonium compounds such as 8-hydroxy quinoline and 3,4,4-trichlorocarbanilide. Other antibacterial substances used in deodorants are diaphene (mixture of bromosalicylanilides), neomycin, bithionol (a bisphenol), and ion-exchange resins. Metal chelates of 1,3-diketones having the formula $R \cdot CO \cdot CH_2 \cdot CO \cdot R_1$ are used. Particularly desirable compounds are the copper, aluminum and magnesium compounds.

The antiperspirants generally contain aluminum salts, zinc compounds and zirconium salts. Very satisfactory compounds are aluminum chlorhydroxide and aluminum chlorhydroxide/lactate complex. Aluminum sulfocarbolate and aluminum chlorhydroxy allantoinate compounds are also very satisfactory. Other aluminum antiperspirant ingredients are aluminum chloride and aluminum sulfate. A very desirable compound is the aluminum sulfamate $Al_2(OH)_4(SO_3NH_2)_2$.

What is claimed is:

1. In an antiperspirant and deodorant composition containing from about 5 to 30% by weight of an astringent wherein the improvement comprises from about 2% by weight to about 20% by weight of a antibacterial compound selected from the group consisting of esters of saturated normal aliphatic 1,3-diols with monocarboxylic acids of saturated normal aliphatic hydrocarbons said esters having 4 to 15 carbon atoms in the diol portion of the molecule and 2 to 20 carbon atoms in the acyl portion of the molecule.

2. An antiperspirant cream which comprises by weight of from about 5 to 20% of glycerol monostearate, 1 to 5% of spermacetti, about 20% to 60% of water, about 5% to 35% of aluminum sulfate, about 2% to 10% of urea, and about 5% to 40% of an ester of a saturated normal aliphatic 1,3-diol, said ester characterized by having 4 to 15 carbon atoms in the diol portion of the molecule and 2 to 20 carbon atoms in the acyl portion of the molecule, said acyl portion of the molecule being derived from a monocarboxylic acid of a saturated normal aliphatic hydrocarbon.

3. Formulation as defined by claim 2 wherein said diol is 1,3-butanediol-1-monooctanoate.

4. Deodorant lotion which comprises by weight about 60% to 90% of ethanol, about 2% to 14% of water and from about 10% to about 20% of an ester of a saturated normal aliphatic 1,3-diol with a monocarboxylic acid of a normal saturated aliphatic hydrocarbon, said ester characterized by having 4 to 15 carbon atoms in the diol portion of the molecule and 2 to 20 carbon atoms in the acyl portion of the molecule.

* * * * *